United States Patent [19]

Makowski et al.

[11] 4,134,870

[45] Jan. 16, 1979

[54] ELASTOMERIC BLEND COMPOSITIONS OF A SULFONATED ELASTOMERIC POLYMER

[75] Inventors: Henry S. Makowski, Scotch Plains; Charles P. O'Farrell, Clark, both of N.J.

[73] Assignee: Exxon Research & Engineering Co., Florham Park, N.J.

[21] Appl. No.: 855,770

[22] Filed: Nov. 29, 1977

[51] Int. Cl.$^2$ .............................................. C08L 91/00
[52] U.S. Cl. .......................... 260/28.5 B; 260/31.2 R; 260/42.33; 260/DIG. 31
[58] Field of Search ............. 260/28.5 B, 42.33, 42.47, 260/31.2, 79.3 R

[56] References Cited

U.S. PATENT DOCUMENTS 4,007,149  2/1977  Burton et al. ................... 260/29.7 B

*Primary Examiner*—Lewis T. Jacobs
*Attorney, Agent, or Firm*—Richard E. Nanfeldt

[57] ABSTRACT

This invention relates to elastomeric blend compositions of a neutralized sulfonated elastomeric polymer. The solid, gel-free compositions include a neutralized sulfonated elastomeric polymer, a hydroxyalkyl carboxylate ester, a non-polar wax, wherein the resultant compositions have both improved physical and rheological properties.

36 Claims, No Drawings

ELASTOMERIC BLEND COMPOSITIONS OF A SULFONATED ELASTOMERIC POLYMER

FIELD OF THE INVENTION

This invention relates to elastomeric blend compositions of a neutralized sulfonated elastomeric polymer. The solid gel-free compositions include a neutralized sulfonated elastomeric polymer, a hydroxyalkyl carboxylate ester, a non-polar wax, wherein the resultant composition have both improved physical and rheological properties.

BACKGROUND OF THE INVENTION

The elastomeric blend compositions of the present instant invention relate to compositions having improved physical and rheological properties for fabrication on conventional type fabricating equipment.

The blend compositions can be readily processed due to their superior rheological properties on conventional plastic fabrication equipment into elastomeric articles having excellent physical properties and desirable rubbery characteristics.

The hydroxyalkyl esters of this invention may be schematically represented as follows:

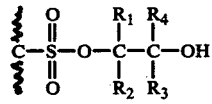

wherein ～C～ is one or more carbon atoms in one or more molecules comprising a polymer and is in the polymer backbone chain of carbon atoms or is in an acyclic, alicyclic, or aromatic group which is pendant to the backbone chain; $R_1$, $R_2$, $R_3$ and $R_4$ are independently selected from the group consisting of hydrogen, $C_1$ to $C_{18}$ straight and branched chain acyclic, alicyclic, aryl, alkylaryl, arylalkyl groups and functional derivatives thereof.

Products which have a limited concentration of ionic groups covalently bonded to one or more carbon atoms of one or more molecules comprising a polymer, when partially or completely neutralized with mono or polyvalent cations such as sodium, zinc, magnesium, lead, ammonium and quaternary ammonium compounds are generally referred to as ionomers. The ionic groups can be covalently bonded to carbon atoms comprising the backbone chain of the polymer, which chain of carbon atoms may be interrupted by hetero atoms such as oxygen, nitrogen and sulfur, or the ionic groups can be bonded to acyclic, alicyclic, or aromatic groups which are pendant to the backbone chain. Solid gel-free ionomers differ from covalently crosslinked elastomers, such as vulcanized rubber, in that while ionomers can be elastomeric at ordinary temperatures, at elevated temperatures they can be extruded, compression molded, blow molded, sheeted, vacuum formed and injection molded.

Sulfonated polymers i.e. those containing free sulfonic acid groups are known to be relatively unstable and are difficult to process in safety or without degradation in conventional plastic or rubber equipment at elevated temperatures. Except for this tendency to degrade it would be advantageous to process the free acid since the relatively weak ionic associations among the acid groups result in a low polymer viscosity permitting easy mixing with neutalizing agents, plasticizers, and other polymers. These systems can then be reacted with a neutralizing agent such as metallic oxides, hydroxides and alkoxides or salts of weak acids such as an acetate or stearate to yield the ionomer.

On the other hand, if the sulfonated polymer is first neutralized with a counterion and the ionomeric product isolated it is found to possess an extraordinarily high viscosity even at elevated temperatures commonly used for processing thermoplastic polymers in conventional equipment and must be mixed with other materials by solution techniques.

A major object of this invention is the preparation of low viscosity, thermally and hydrolytically stable esters of sulfonated polymers which are readily convertible to ionomers by reaction with a basic substance. A further object of this invention is the preparation of ionomers which comprises reacting a polymer having one or more sulfonic acid groups covalently linked or bonded to one or more carbon atoms in one or more molecules comprising said polymer with an oxirane to form a hydroxyalkyl ester, mixing the formed hydroxyalkyl ester with a wax and then reacting said formed ester with a basic substance selected from the group consisting of mono and polyvalent metallic oxides, hydroxides, alkoxides, and salts of acids having a lower $K_a$ than the sulfonic acid.

A further object of the present invention is to provide solid, gel-free blend compositions of a neutralized sulfonated polymer, a non-polar wax, and a hydroxyalkyl carboxylate ester, wherein the composition has improved processability on conventional fabricating equipment. These, and other objects of this invention will be further apparent in the detailed description of the invention which follows below.

DESCRIPTION OF THE PRIOR ART

The reaction of an oxirane (e.g. ethylene oxide) with a sulfonic acid to form a hydroxyethyl ester is old in the art. U.S. Pat. No. 2,208,581 discloses the preparation of surface active agents by the reaction of low molecular weight sulfonic acids with a compound containing an olefin oxide.

In a first copending application concerning preparation of ionomeric latex epoxides are used to quench the sulfonation reaction and allow the cement to be processable in a unique latex process. However, this copending application fails to teach a method for the isolation of a solid, gel-free hydrolytically stable polymeric hydroxyalkyl sulfonate having desirable physical and rheological properties, wherein these polymeric sulfonates are readily convertible to metal sulfonates during and after processing thereby permitting fabrication on conventional plastic type equipment to a variety of useful articles. Furthermore, it is completely unpredictable that a solid, gel-free hydrolytically stable polymeric hydroxyalkyl sulfonate is capable of being isolated in a steam stripping operation under acidic conditions and at higher temperatures based upon the published literature on the hydrolytic stability of low molecular weight alkyl sulfonates. No references have been found in the chemical or patent literature for the preparation of hydroxyalkyl esters of polymeric sulfonic acids or for the preparation of ionomers from these esters by reaction with a basic compound or salt of an acid having a lower $K_a$ than the sulfonic acid.

In another copending application the preparation of polymeric hydroxyalkyl sulfonates are described wherein an acid form of a sulfonated polymer is reacted with an oxirane having the general formula:

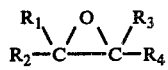

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. The improved blend compositions of the present instant invention provide materials of superior physical and rheological properties.

SUMMARY OF THE INVENTION

It has been found surprisingly that gel-free, solid compositions formed from blends of neutralized sulfonated elastomeric materials, in particular a select class of neutralized sulfonated elastomeric polymers, inorganic fillers, a non-polar wax and a preferential hydroxyalkyl carboxylate ester have suitable rheological and physical properties for the formation of an elastomeric article by an extrusion process.

Accordingly, it is an object of our present invention to provide unique and novel solid, gel-free compositions of matter for producing high performance elastomeric articles by an extrusion or injection molding process, wherein the compositions of the elastomeric article have a viscosity of $0.73$ sec$^{-1}$ at 200° C. of about less than $10^5$ poise thereby providing compositions having improved processability on conventional plastic type fabricating equipment.

It is an object of the instant invention to describe a class of compounds based on sulfonated ethylenepropylene terpolymers which can be processed on plastics type extrusion equipment at high rates and which possess improved physical characteristics such as low temperature flexibility and rubbery feel. One of the essential aspects of the present invention comprises the discovery that only a restricted class of the subject sulfonated elastomers may be readily employed for extrusion fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as extrusion to form articles which can be classified as sheet, profiles, tubing and film. The applications employing these fabrication techniques such as windshield wipers, weather stripping, refrigerator door seals, garden hose, etc. require materials which are flexible and tough. Two broad classifications of materials which have been used are vulcanized elastomers and plasticized thermoplastics such as polyvinyl chloride (PVC). The fabrication of extrusion articles based on vulcanized elastomers is a major item of cost involving the vulcanization procedure. Not only is this step costly from an energy intensive viewpoint, but it is time consuming. The use of plasticating extrusion for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics type extrusion equipment at conventional plastics rates and which possess the flexibility and subjective rubbery characteristics of vulcanized elastomers.

The polymeric hydroxy sulfonates suitable for the making of the compositions of the present instant invention are described in the copending application entitled "Polymeric Hydroxyalkyl Sulfonates" and incorporated herein by reference. (U.S. Ser. No. 855,763, filed Nov. 29, 1977)

GENERAL DESCRIPTION

This present invention relates to unique and solid gel-free blend compositions of a neutralized sulfonated elastomeric polymer, a non-polar wax and a hydroxyalkyl carboxylate ester wherein the resultant composition has a viscosity at $0.73$ sec$^{-1}$ at 200° C. of about less than $10^5$ poise, wherein the compositions are readily processable in a conventional extrusion or injection molding process into a high performance elastomeric article such as a shoe sole. The resultant elastomeric article has excellent low temperature flexibility, excellent flex fatigue, superior dimensional stability, and good resilience.

The neutralized sulfonated elastomeric polymers of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers or isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40-50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Patent No. 1,030,289 and French Patent No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000, more preferably of about 15,000 to about 100,000, more preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

In carrying out the invention, the elastomeric polymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiphene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or chlorinated aromatic hydrocarbon or in the absence of a solvent.

The amount of desirable sulfonation depends on the particular application. Preferably, the elastomeric polymer is sulfonated at about 5 to about 60 meq $SO_3H/100$ g of polymer, more preferably at about 10 to about 50 meq. $SO_3H/100g$ of polymer, and most preferably at about 20 to about 40 meq. $SO_3H/100g$ of polymer. The meq. of $SO_3H/100g$ of polymer can be determined by dissolving the acid form of the sulfonated polymer in a mixed solvent of 95 parts toluene and 5 parts methanol at a concentration level of 50 grams per liter of solvent. The acid form is titrated with sodium hydroxide in ethanol to an Alizarin Thymolphthalein endpoint. Dietert sulfur analysis and the acid titration agree with regard to combined sulfur when a sulfonation is conducted under proper and controlled conditions.

It should be pointed out that neither the sulfonating agent nor the manner of sulfonation is critical, provided that the sulfonating method does not degrade the polymer backbone.

The sulfonation reaction can be terminated and the sulfonated polymer converted to a hydroxyethyl ester by the addition of an oxirane to the reaction mixture, or the sulfonated polymer recovered by precipitation for example with a polar solvent such as methanol or acetone, and after removal of the polar solvent, redissolved in a non-reactive solvent and converted to the hydroxyalkyl ester by reaction with an oxirane. (See copending application U.S. Ser. No. 855,763 filed Nov. 29, 1977).

Oxiranes which are suitable for the practice of this invention have the general formula:

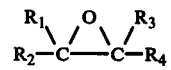

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, aryl-alkyl radicals and functional derivatives thereof. Non-limiting examples of suitable oxiranes include ethylene oxide, propylene oxide, allyl glycidyl ether, styrene oxide, epichlorohydrin and epoxidized methyl oleate.

Ethylene glycol, propylene glycol and their monomethyl or monoethyl ethers are useful as their mono sodium or potassium salts for the preparation of the hydroxyethyl esters from polymers which have been chlorosulfonated.

In accordance with this invention, polymers having sulfonic acid groups covalently linked to carbon atoms comprising the polymer can be reacted with an oxirane to yield hydroxyalkyl esters which are free of acid and can be isolated as for example by steam stripping or precipitation with a polar solvent and the product dried, mixed, compounded and the gel-free hydroxyalkyl sulfonate partially or completely converted to the metal sulfonate to form an ionomer by mixing with a mono or polyvalent basic compound or salt of an acid having a lower $K_a$ than the sulfonic acid in conventional equipment without decomposition or corrosion. The hydroxyethyl esters are:

(1) stable to hydrolysis under steam stripping conditions;

(2) thermally stable at the temperatures used in processing thermoplastic and elastomeric materials;

(3) convertible to an ionomer by mixing in bulk with a basic compound or salt of a weak acid, followed by the application of heat; and (4) permits the preparation of ionomers which are free of acid when less than the stoichiometric quantity, based on the sulfonic acid content, of a basic compound or salt is used to convert the ester to an ionomer. The hydroxyalkyl sulfonates and the neutralized sulfonated elastomeric polymers are gel-free. Gel is measured by stirring a given weight of the polymeric hydroxyalkyl sulfonate in a solvent comprised of 95 toluene/5 methanol at a concentration of 5 wt. % for 24 hours, allowing the mixture to settle, withdrawing a weighed sample of the supernatant solution and evaporating to dryness.

The products and the process of this invention thus avoid all of the difficulties associated with working with the free acid or solution neutralized products.

The process comprises dissolving the polymer at a concentration in the range of about 3 to about 25 wt. % in a non-reactive solvent, sulfonating the polymer to the desired degree with an appropriate sulfonating agent, reacting the sulfonated polymer, either before isolation or after isolation and purification, in a solvent with an appropriate oxirane, separating the reaction product of the sulfonated polymer with the oxirane from the solvent and converting said reaction product to an ionomer by reaction with about 10 to more than 100% of the stoichiometric proportion of a metallic base or salt of an acid having a lower $K_a$ than the sulfonic acid, based on the sulfonic acid content of said sulfonated polymer, and recovering said ionomer.

The hydroxyalkyl sulfonate is recovered from the cement by conventional steam stripping methods. The solid, gel-free hydroxyalkyl sulfonate is blended with a non-polar wax or a combination of a filler and a non-polar wax by techniques well known in the art. For example, the blend composition can be dry compounded on a two roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing type equipment. The Banbury mixing device is the preferred batch type mixer, and the twin screw extruder is the preferred continuous mixer.

The fillers employed in the present invention are selected from carbon blacks, alumino-silicates, talcs, calcium silicate, ground calcium carbonate, water precipitated calcium carbonate, magnesium silicate, or delaminated, calcined or hydrated clays and mixtures thereof.

Typically, mineral fillers have a particle size of about 0.03 to about 15 microns, more preferably about 0.5 to about 10, and most preferably about 2 to about 10. The oil absorption as measured by grams of oil absorbed by 100 grams of filler is about 10 to about 70, more preferably about 10 to about 50 and most preferably about 10 to about 30. Typical mineral fillers employed in this invention are illustrated in Table I.

Carbon blacks range widely in physical and chemical properties. Physically, they vary in average particle size, particle size distribution, specific surface area, porosity of surface, and the tendency of the individual primary particles to be associated in chain-like structure. Chemically, they vary in the population and nature of oxygenated structures combined with their surface. Typical carbon blacks employed in this invention are illustrated in Table II.

These mineral and carbon black fillers are blended into the blend composition at about 5 to about 300 parts per hundred; more preferably at about 20 to about 250; and most preferably at about 25 to about 200.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | 0.3–0.4 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate (talc) | Mistron Vapor | 60–70 | 2.75 | 2 | 9.0–9.5 |

TABLE II

| Carbon Black | Type | Nigrometer Index | Sp.Surface Area, $m^2/g$ | EM Diameter (dm)A* | Volatile % | pH | Total Acids, meq/g |
|---|---|---|---|---|---|---|---|
| Black Pearls 46 | Channel | 65 | 800 | 130 | 14.0 | 3.0 | 2.42 |
| Black Pearls 74 | Channel | 74 | 332 | 170 | 5.0 | 5.0 | 0.95 |
| Spheron 9 | Channel | 85 | 105 | 290 | 5.0 | 5.0 | 0.94 |
| Vulcan 9 | Oil Furnace(SAF) | 86 | 124 | 200 | 1.5 | 8.5 | 0.84 |
| Vulcan 3 | Oil Furnace(HAF) | 90 | 74 | 290 | 1.0 | 8.5 | 0.68 |
| Regal 330 | Low Structure Oil Furnace | 84.5 | — | 240 | — | 8.5 | 0.42 |
| Sterling S | Gas Furnace | 99 | 23 | 800 | 1.0 | 9.5 | 0.18 |
| Sterling FT | Thermal (FT) | 107 | 13 | 1800 | 0.5 | 8.5 | 0.12 |

TABLE II-continued

| Carbon Black | Type | Nigrometer Index | Sp.Surface Area, m²/g | EM Diameter (dm)A° | Volatile % | pH | Total Acids, meq/g |
|---|---|---|---|---|---|---|---|
| Sterling MT | Thermal (MT) | 110 | 6 | 4700 | 0.5 | 8.5 | 0.10 |

Waxes are derived from various sources: petroleum waxes covering paraffin and microcrystalline wax; synthetic waxes including polyethylene and Fischer-Tropsch wax; natural waxes from plants, insects and animals. The petroleum and synthetic waxes are most important for the present invention.

Other than paraffinic, napthenic and aromatic hydrocarbon groups waxes can contain polar functional groups such as alcohols, ketones, and esters. It is preferred that the waxes used in this invention be predominantly non-polar since polar functional groups function as plasticizers for the ionic sulfonate groups. Excessive plasticization is undesirable. The largest percentage of polar functional groups in waxes are those containing oxygen by virtue of hydrocarbon oxidation. For the purpose of this invention, a wax is considered to be non-polar when it contains less than 4.0 wt. %, more preferably less than 2.0 wt. % oxygen.

A description of paraffinic and microcrystalline waxes is given in the Kirk-Othmer "Encyclopedia of Polymer Science and Technology," 1971, Vol. 14, Pg 768–779 and is abstracted below.

Paraffin waxes consist primarily of straight-chain saturated hydrocarbons with only a small amount of branching such as 2-methyl groups, near the end of the chain. The amount of n-alkanes in paraffin wax usually exceeds 75% and may reach almost 100%. The molecular weights of the hydrocarbons in paraffin wax range from about 280 to 560 ($C_{20}$–$C_{40}$), with each specific wax having a range of about eight to fifteen carbon numbers.

The ranges of properties representative of several different paraffin waxes are presented in Table III.

insoluble in polar solvents such as water and methanol.

TABLE IV

TYPICAL PHYSICAL PROPERTIES OF PETROLEUM WAXES

|  | Paraffin Wax | Microcrystalline Wax |
|---|---|---|
| Density of solid at 20° C g/ml | 0.88–0.93 | 0.89–0.94 |
| Density of liquid at 100° C g/ml | 0.73–0.77 | 0.78–0.81 |
| Refractive index in solid state, 20° C | 1.526–1.535 | |
| Refractive index, liquid, 100/° C | 1.418–1.433 | 1.435–1.445 |
| Specific heat of liquid, cal/g° C | 0.50–0.53 | 0.50–0.53 |
| Latent heat of fusion, cal/g | 55–61 | 50–58 |

Microcrystalline waxes are the solid hydrocarbon mixtures refined by deoiling crude petrolatums, which are obtained from the dewaxing of residual lubricating oil stocks and tank-bottom wax. These waxes are known as microcrystalline because their relatively small crystals give an amorphous appearance to the waxes in the solid state.

Microcrystalline waxes vary considerably in composition and properties, in contrast to paraffin wax. Generally, microcrystalline waxes consist of branched-chain hydrocarbons and alkylcycloaliphatic (naphthenic) hydrocarbons as well as some straight-chain molecules, depending on the particular wax. The molecular weights range from about 450 to 800 ($C_{35}$–$C_{60}$). Some physical properties are listed in Table IV.

The waxes employed in this present invention have a softening point of about 125° F. to about 220° F., more preferably about 135° F. to about 200° F. and most

TABLE III

TYPICAL PROPERTIES OF PARAFFIN WAX IN DIFFERENT MELTING POINT RANGES

|  | A[a] | B[b] | C[c] | D[d] | E[e] |
|---|---|---|---|---|---|
| Melting point, ° C (ASTM-D-87) | 51–53 | 54–56 | 56–58 | 60–62 | 67–71 |
| Oil Content, % (ASTM-D-721) | 0.1–0.4 | 0.1–0.3 | 0.1–0.2 | 0.1–0.2 | 0.2–0.5 |
| Hardness (penetration) at 25° C (77° F) (ASTM-D-1321) | 14–20 | 12–15 | 10–14 | 9–14 | 9–18 |
| Hardness (penetration) at 38° C (100° F) (ASTM-D-1321) | 80–200 | 50–100 | 40–60 | 20–40 | 13–38 |
| Saybolt viscosity at 99° C (210° F), SUS (ASTM-D-88) | 37–39 | 37–39 | 38–40 | 40–42 | 45–53 |
| Kinematic viscosity at 99° C (210° F), cSt (ASTM-D-445) | 3.2–3.8 | 3.2–3.8 | 3.6–3.9 | 4.1–4.9 | 5.57–8.2 |

[a]Includes Atlantic Wax 151, Essowax 2530, Gulfwax 27, Mobilwax 128/130, Shellwax 100, Sunoco Wax 3425.
[b]Includes Aristowax 130/134, Atlantic Wax 171, Boron Wax 133/135, Essowax 3050, Shellwax 120, Sunoco Wax 3422.
[c]Includes Boron Wax 138/140, Eskar Wax R-35, Essowax 3250, Mobil Wax 138/140, Sinclair Wax 133, Sunoco Wax 3420.
[d]Includes Atlantic Wax 1115, Essowax 4030, Gulfwax 40, Pacemaker Wax 45, Sinclair Wax 141, Shellwax 270.
[e]Includes Aristowax 165, Essowax 5250, Shellwax 300, Sunoco Wax 5512.

Some of the commercial waxes included in the listed property range are also given. Paraffin waxes are generally lower melting, have lower molecular weight, and have lower viscosities when liquid than microcrystalline waxes. Paraffin waxes, in the solid state, exist in the form of large, distinct crystals, in contrast to the microscopic crystals of microcrystalline waxes. Physical properties of paraffin wax of an average molecular weight of 400 are listed in Table IV. Paraffin wax is soluble in non-polar organic solvents such as benzene, chloroform, carbon tetrachloride, and naphtha, and preferably about 150° F. to about 200° F. The preferred waxes have an $\overline{M}n$ of about 300 to about 4000.

The waxes are incorporated into the blend composition at a concentration level of about 2 to about 150 parts per hundred; more preferably about 5 to 100; and most preferably about 5 to about 80. The solid gel-free hydroxyalkyl sulfonated polymer is converted into a neutralized sulfonated elastomeric polymer by reacting it with a neutralizing agent. The neutralizing agent is a base such as mono and polyvalent metallic oxides, hydroxides, and alkoxides, or salts of weak acids such as carboxylates of which acetates, laurates and stearates are non-limiting examples. Preferred are metal salts of carboxylic acids.

When a metal carboxylate is used to neutralize the polymeric sulfonic acid a carboxylic acid is released.

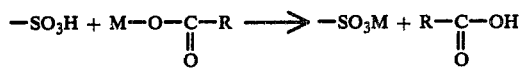

When the polymeric sulfonic acids are neutralized in bulk with the lower molecular weight metal carboxylates the presence of the generated carboxylic acid, e.g. acetic acid, is undesirable because of odor and possible corrosion. The higher molecular weight carboxylic acids, such as stearic acid, are not odoriferous or corrosive. However, these higher molecular weight carboxylic acids, which are excellent flow improvers at elevated temperatures, also exert deleterious effects upon ionomer physical properties at lower temperatures and so are less desirable than other plasticizers.

The reaction between metal carboxylate and hydroxyalkyl sulfonate produces a mixture of the metal sulfonate and a hydroxyalkyl carobyxlate ester in equal proportion for complete neutralization.

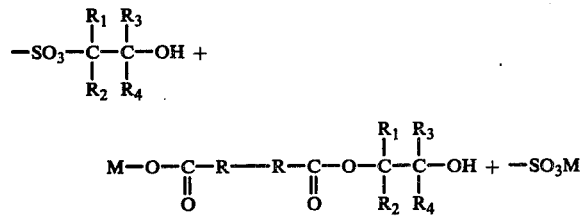

The lower molecular weight hydroxyalkyl carboxylates are not odoriferous or corrosive as the corresponding carboxylic acids. The higher molecular weight carboxylates are not as deleterious to physical properties as are the corresponding carboxylic acids.

The metals which are preferred for the formation of ionic crosslinks of the sulfonated polymer are selected from the group consisting of Groups I-A, II-A, I-B and II-B of the Periodic Table of Elements and lead, aluminum, iron and antimony. Most preferred are bases and fatty acid salts of zinc, magnesium, barium, sodium and lead.

The wax incorporated into the blend compositions of the present invention, in conjunction with the type of elastomeric polymer, the degree of sulfonation, and the metal counterion of the neutralized sulfonated elastomeric polymer and the formed hydroxyalkyl carboxylate ester give materials processable by extrusion or injection molding processes into elastomeric articles having the desirable physical and rheological properties.

Conversion of the uncompounded or compounded hydroxyethyl sulfonate by means of a metallic base or carboxylate is readily accomplished at elevated temperature, for example 120° C. to 260° C., most preferably, 150° C. to 200° C. These temperatures are obtainable in equipment used for processing plastic and elastomeric materials such as Banbury mixers and extruders. Ionomers made by the bulk neutralization of the hydroxyalkyl ester of the sulfonated polymer permits the formulation of compounds with excellent processability for extrusion, injection molding, vacuum forming, compression molding and similar operations. This invention also permits a polymer to be sulfonated at one site and shipped as the hydroxyalkyl ester in a stable, corrosion-free state to a formulator at another site who can then prepare a variety of ionomers best suited to a particular use.

The compounding of the wax with the polymeric hydroxyalkyl sulfonate can be done prior to the addition of the neutralizing agent, wherein the neutralizing agent is added subsequently to the blend of the additives and polymeric hydroxyalkyl sulfonate. Alternatively, the wax and neutralizing agent can be compounded with the polymeric hydroxyalkyl sulfonate at a temperature below about 100° C. After a homogeneous blend has been achieved, the temperature of compounding is increased to a temperature of about 120° C. to about 260° C. in order to effect neutralization.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

The polymeric hydroxyalkyl sulfonates suitable for the making of the compositions of the present instant invention are described in the copending application entitled "Polymeric Hydroxyalkyl Sulfonates" and incorporated herein by reference.

EXAMPLE 1

EPDM comprising 50 wt. % of ethylene, 45 wt. % of propylene and 5 wt. % of 5-ethylidene-2-norbornene and having a Mooney viscosity of (ML, 1+8, 212° F.) of about 20 was sulfonated as follows: to a well stirred solution of 800 grams of the polymer and 45.9 ml. (486 mmoles) of acetic anhydride in 8.0 liters of Exxon hexane at room temperature was slowly added 16.8 ml. (300 mmoles) of concentration sulfuric acid. The mixture was stirred for 30 minutes at room temperature, and the sulfonation reaction was terminated through the addition of 23.2 g (400 mmoles) of propylene oxide. Then 4.0 g of Antioxidant 2246 was added, and the reaction mixture was stirred for 30 minutes. The viscosity of the reaction mixture increased after the addition of the propylene oxide.

The polymeric hydroxypropyl sulfonate was isolated by steam stripping, pulverizing the polymer in a Waring blender with water, and drying the resultant wet crumb on a rubber mill at about 120° F. The product contained 33.4 meq. of sulfonate groups/100g polymer as calculated from the Dietert sulfur analysis (1.07 wt. % sulfur).

EXAMPLE 2

A sulfonation was effected under conditions identical to those described in Example 1. The sulfonation was then terminated with 37.0g (400 mmoles) of epichlorohydrin, and the resultant chlorohydroxypropyl sulfonate stabilized and worked up as in Example 1.

The product contained 1.11 wt. % sulfur by Dietert sulfur analysis which corresponds to 34.7 meq. of sulfonate groups/100g polymer.

EXAMPLES 3-9

The polymeric hydroxyalkyl sulfonates described in Examples 1 and 2 were compounded on a rubber mill according to the formulations in Table V. The properties of the waxes used are given in Table VI. Samples for testing were prepared by heating the formulations in molds at 350° F. for 30 minutes. Tensile properties and melt index at 190° C. were determined.

A melt index of 3.9g/10 minutes at 190° C. and 250 psi (Example 8) corresponds to an apparent viscosity at 0.73 sec$^{-1}$ of about $1.5 \times 10^5$ poise. A melt index of 5.2g/10 minutes (Example 4) under the same conditions corresponds to an apparent viscosity at 0.73 sec$^{-1}$ of about $8 \times 10^4$ poise.

These examples show that through the proper selection of metal carboxylate, wax type and concentration, and filler type and concentration it is possible to prepare formulations with excellent physical properties and yet which are processible.

TABLE V

| | 3 | 4 | 5 | 6 | 7 | 8 | 9 |
|---|---|---|---|---|---|---|---|
| Hydroxypropyl Sulfonate (Example 1) | 100 | 100 | 100 | 100 | — | 100 | 100 |
| Chloro- hydroxypropyl Sulfonate (Example 2) | — | — | — | — | 100 | — | — |
| Zinc Stearate | 28 | 28 | — | — | — | — | 28 |
| Lead Stearate | — | — | 31.5 | — | 31.5 | — | — |
| Magnesium Stearate | — | — | — | 26.5 | — | 26.5 | — |
| Mekon 10 | — | 20 | — | — | — | — | 50 |
| Parvan 5250 | — | — | 100 | — | 100 | 50 | — |
| Multiwax 180 | — | — | — | 150 | — | — | — |
| Purecal U | — | — | — | — | — | 20 | — |
| MT Black | — | — | — | — | — | — | 200 |
| 300% Modulus, psi | 390 | 395 | 550 | 380 | 540 | 650 | — |
| Tensile Strength, psi | 1580 | 1760 | 1350 | 820 | 1130 | 1910 | 905 |
| Elongation, % | 650 | 680 | 525 | 680 | 580 | 690 | 330 |
| Melt Index at 190° C., g/10 minutes | 4.5 | 5.2 | 1.1 | 22.4 | 2.1 | 3.9 | 1.2 |
| Pressure, psi | 250 | 250 | 43 | 43 | 24 | 250 | 43 |

TABLE VI

| Brand Name | Parven 5250 | Multiwax 180A | Mekon 10 |
|---|---|---|---|
| Supplier | Exxon Co., USA | Witco Chemical Co. | Western Petrochemical |
| Additional description | Refined paraffin wax, crystallized from distillate lube cut | Refined micro- crystalline wax, crystallized from residual lube fraction | Refined microcrystal- line wax, crystallized from tank bottoms |
| Approx. Mol. Wt., $\overline{M}n$ | ~500 | 717 | 702 |
| Plateau Melting Pt., D 87, ° F | — | — | 185 |
| Drop Melting Pt., D 127, ° F | 152 | 180 | 197 |
| Density at 23° C | 0.923 | 0.928 | 0.942 |
| Kinematic Viscosity D 445, cs at 210° F | 6.7 | 16.9 | 16.1 |
| at 250° F | 4.7 | | |
| Needle Penetration, D 1321, mm/10, | | | |
| at 77° F | 16 | 15 | 3 |
| at 100° F | 31 | 32 | |
| at 110° F | ~42 | 44 | 10 |

Since many modifications and variations of this invention may be made without departing from the spirit or scope of the invention thereof, it is not intended to limit the spirit or scope thereof to the specific examples thereof.

What is claimed is:

1. A solid gel-free elastomeric blend composition consisting essentially of:
   (a) a neutralized sulfonated elastomeric polymer having about 10 to about 50 meq. of metal sulfonate groups per 100 grams of said polymer, at least 90 percent of said metal sulfonate groups being neutralized with a metal counterion;
   (b) about 2 to about 50 parts by weight of a hydroxyalkyl carboxylate ester per 100 parts of said neutralized sulfonated elastomeric polymer, said hydroxyalkyl carboxylate having the formula:

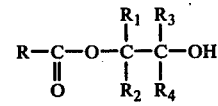

wherein R, R$_1$, R$_2$, R$_3$ and R$_4$ are independently selected from the group consisting of hydrogen, C$_1$ to C$_{18}$ straight and branched chain acyclic, alicyclic, aryl, alkylaryl and/or arylalkyl groups and functional derivatives thereof and mixtures thereof; and
   (c) about 2 to about 150 parts by weight of a nonpolar wax per 100 parts of said neutralized sulfonated elastomeric polymer.

2. A composition according to claim 1, wherein said concentration of said wax is less than about 50 parts per hundred by weight.

3. A composition according to claim 1, wherein said wax has less than about 2 wt. % of polar type compounds.

4. A composition according to claim 1, wherein said wax has an $\overline{M}n$ of about at least 300.

5. A composition according to claim 1, wherein said wax is selected from the group consisting of paraffinics and microcrystalline waxes.

6. A composition according to claim 1, wherein said wax is a paraffinic having an $\overline{M}n$ of at least about 1000.

7. A composition according to claim 1, wherein said sulfonated elastomeric polymer is derived from an unsulfonated elastomeric polymer selected from the group consisting of butyl rubber, and EPDM terpolymers.

8. A composition according to claim 7, wherein said EPDM terpolymer consists essentially of about 40 to about 75 wt. % of ethylene, from about 15 to about 58 wt. % of an alpha-olefin, and about 2 to about 10 wt. % of a diene monomer.

9. A composition according to claim 8, wherein said diene is non-conjugated.

10. A composition according to claim 8, wherein said diene is selected from the group consisting of 1,4-hexadiene, dicyclopentadiene, alkenyl substituted norbornenes, alkylidene substituted norbornenes, methylene norbornene and tetrahydroindene.

11. A composition according to claim 8, wherein said diene is 1,4-hexadiene.

12. A composition according to claim 8, wherein said diene is 5-ethylidene-2-norbornene.

13. A composition according to claim 1, wherein said metal counterion is selected from the group consisting of lead, aluminum, iron, antimony and Groups I-A, II-A, I-B, II-B of the Periodic Table of Elements and mixtures thereof.

14. A composition according to claim 1, wherein said non-polar wax is selected from the group consisting of synthetic, natural and petroleum waxes.

15. A composition according to claim 1, further comprising a filler at a concentration level of about 5 to about 300 parts per hundred.

16. A composition according to claim 15, wherein said filler has a particle size of about 0.03 to about 15 microns.

17. A composition according to claim 15, wherein said filler has an oil absorption of about 10 to about 120.

18. A composition according to claim 15, wherein said filler is selected from the group consisting of carbon black, clay, talc, calcium carbonate and mixtures thereof.

19. A solid gel-free composition consisting essentially of:
    (a) a hydroxyalkyl sulfonated polymer; and
    (b) about 2 to about 150 parts by weight of a non-polar wax per 100 parts of said hydroxyalkyl sulfonated polymer.

20. A composition according to claim 19, wherein said concentration of said wax is less than about 50.

21. A composition according to claim 19, wherein said wax has less than about 2 wt. % of polar type compounds.

22. A composition according to claim 19, wherein said wax has an $\overline{M}n$ of about at least 300.

23. A composition according to claim 19, wherein said wax is selected from the group consisting of paraffinics, and microcrystalline waxes.

24. A composition according to claim 19, wherein said wax is a paraffinic having an $\overline{M}n$ of at least about 300.

25. A composition according to claim 19, wherein said sulfonated elastomeric polymer is derived from an unsulfonated elastomeric polymer selected from the group consisting of butyl rubber, and EPDM terpolymers.

26. A composition according to claim 25, wherein said EPDM terpolymer consists of about 40 to about 75 wt. % of ethylene, from about 15 to about 58 wt. % of an alpha-olefin, and about 2 to about 10 wt. % of a diene monomer.

27. A composition according to claim 26, wherein said diene is non-conjugated.

28. A composition according to claim 26, wherein said diene is selected from the group consisting of 1,4-hexadiene, dicyclopentadiene, alkenyl substituted norbornenes, alkylidene substituted norbornenes, methylene norbornene, and tetrahydroindene.

29. A composition according to claim 26, wherein said diene is 1,4-hexadiene.

30. A composition according to claim 26, wherein said diene is 5-ethylidene-2-norbornene.

31. A composition according to claim 19, wherein said hydroxyalkyl sulfonate is neutralized with a metal counterion being selected from the group consisting of lead, aluminum, iron, antimony and Groups I-A, II-A, I-B, II-B or the Periodic Table of Elements and mixtures thereof.

32. A composition according to claim 19, wherein said non-polar wax is selected from the group consisting of synthetic, natural and petroleum waxes.

33. A composition according to claim 19, further comprising a filler at a concentration level of about 5 to about 250 parts per hundred.

34. A composition according to claim 33, wherein said filler has a particle size of about 0.03 to about 15 microns.

35. A composition according to claim 33, wherein said filler has an oil absorption of about 10 to about 120.

36. A composition according to claim 33, wherein said filler is selected from the group consisting of carbon black, clay, talc, calcium carbonate and mixtures thereof.

* * * * *